Sept. 20, 1966  NOBORU AMANO ETAL  3,274,381
DIVISION CIRCUIT
Filed Sept. 11, 1962

INVENTORS
Noboru Amano &
Naoaki Wakayama
BY *Otto John Munz*
ATTORNEY

United States Patent Office 3,274,381
Patented Sept. 20, 1966

3,274,381
DIVISION CIRCUIT
Noboru Amano, Mito-City, and Naoaki Wakayama, Naka-gun, Ibaraki-ken, Japan, assignors to Nihon Genshiryoku Kenkyu Sho, Tokyo, Japan, a corporation of Japan
Filed Sept. 11, 1962, Ser. No. 222,834
Claims priority, application Japan, Nov. 18, 1961, 36/41,655
5 Claims. (Cl. 235—196)

This invention relates to a division circuit and more particularly, relates to a division circuit in which an alternating current modulated by a current or a voltage proportional to a dividend and a current proportional to a divisor are simultaneously introduced into a logarithmic element and only the component of the A.C. fundamental wave among the voltage appearing across the both ends of said logarithmic element is picked up, amplified and demodulated.

It is an object of this invention to provide a division circuit in which the divisional operation of an analogue quantity is effected with speed and accuracy by means of a simple construction.

Figure 1:
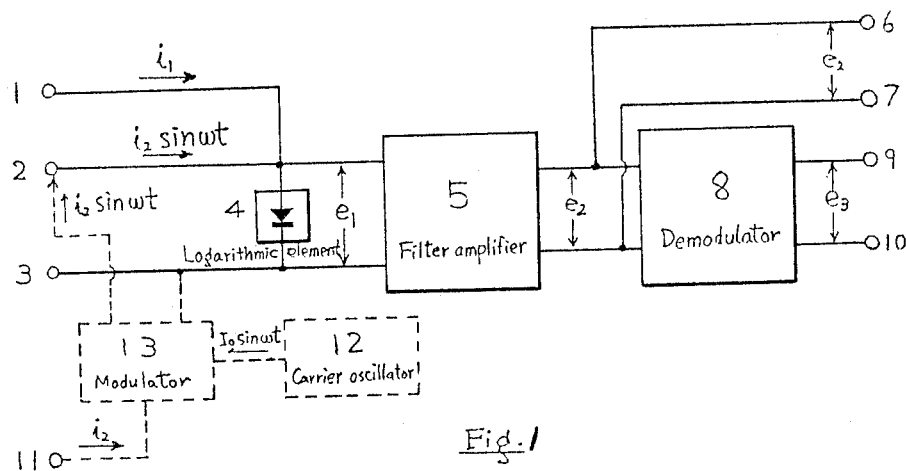

The nature of the invention as well as other objects and advantages thereof will become apparent from consideration of the following specification and relating to the annexed drawing, in which FIGURE 1 is a block diagram of a division circuit of the invention.

Figure 2:
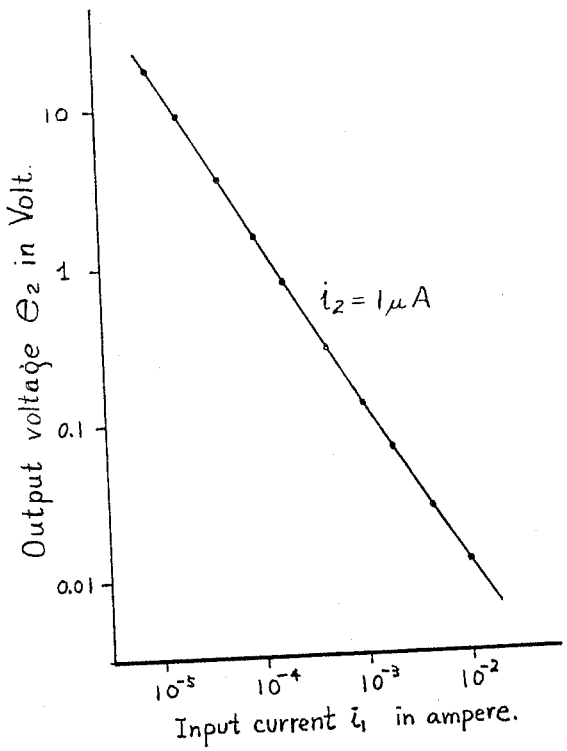

FIGURE 2 is a graphical plot showing the relationship among the input currents and output voltage of the division circuit of FIGURE 1.

In FIG. 1, terminal 1 is an input terminal for a D.C. current $i_1$ the magnitude of which is proportional to divisor A, terminal 2 is an input terminal for an A.C. current $i_2 \sin \omega t$ the amplitude of which is proportional to a dividend B. Terminal 3 is a common input terminal for these currents. The voltage across logarithmic element 4, is a linear function of the logarithm of the current through the element.

Filter amplifier 5 is a tuned amplifier of which the tuned frequency is $\omega$, and the input impedance of this amplifier is quite large compared with the dynamic impedance of the logarithmic element 4. Terminals 6 and 7 are output terminals for an A.C. signal whose amplitude is proportional to a quotient $i_2/i_1$ or B/A. When the input current corresponding to the dividend B is D.C., devices which are shown by broken lines in FIG. 1 are used. Terminal 11 is an input terminal for the D.C. current whose magnitude is proportional to the dividend B. Carrier oscillator 12 is a device to generate $I_0 \sin \omega t$. Modulator 13 is a device to obtain $i_2 \sin \omega t$ with the suppressed-carrier-modulation.

The operation of the division circuit of this invention shown in FIG. 1 is as follows:

A D.C. current $i_1$ whose magnitude is proportional to a divisor A enters from terminal 1 and an A.C. current $i_2 \sin \omega t$ whose amplitude $i_2$ is proportional to a divident B enters from terminal 2 and these currents return to terminal 3 through the logarithmic element 4. In this case, $i_1$ must be arranged to be at least several times larger than $i_2$, and angular frequency $\omega$ is arranged to be quite large compared with the angular frequency of the variation of $i_1$ and $i_2$. A voltage $e_1$ occurring across the logarithmic element 4 is represented as follows:

$e_1 = a \ln(i_1 + i_2 \sin \omega t) + b$ $= a \ln\left[i_1\left(1 + \frac{i_2}{i_1} \sin \omega t\right)\right] + b$ $= a \ln i_1 + b + a \ln\left(1 + \frac{i_2}{i_1} \sin \omega t\right)$ $= a \ln i_1 + b + a\left[\frac{i_2}{i_1}\sin \omega t - \frac{1}{2}\left(\frac{i_2}{i_1}\right)^2 \sin^2 \omega t + \frac{1}{3}\left(\frac{i_2}{i_1}\right)^3 \sin^3 \omega t - \frac{1}{4}\left(\frac{i_2}{i_1}\right)^4 \sin^4 \omega t + \ldots\right]$ $= a \ln i_1 + b + a\left[\frac{i_2}{i_1} \sin \omega t - \frac{1}{2}\left(\frac{i_2}{i_1}\right)^2\left(\frac{1-\cos 2\omega t}{2}\right) + \frac{1}{3}\left(\frac{i_2}{i_1}\right)^3\left(\frac{3 \sin \omega t - \sin 3\omega t}{4}\right) - \frac{1}{4}\left(\frac{i_2}{i_1}\right)^4\left(\frac{\cos 4\omega t - 4\cos 2\omega t + 3}{8}\right) + \ldots\right]$ (1)

where: $a$ and $b$ are constants for a given logarithmic element.

The voltage $e_1$ is amplified by the filter amplifier 5, which has a tuned angular frequency $\omega$, and only the signal components which have the angular frequency $\omega$ are amplified and the others are rejected. A output voltage $e_2$ of the filter amplifier 5, which is also the voltage between terminal 6 and terminal 7, is calculated by picking up and adding up terms containing sin $\omega t$ in Eq. 1 and multiplying this sum by the voltage gain of the amplifier 5. Therefore, $e_2$ is represented as follows:

$e_2 = A \cdot C\left[\frac{i_2}{i_1} + \frac{1}{4}\left(\frac{i_2}{i_1}\right)^3 + \frac{1}{8}\left(\frac{i_2}{i_1}\right)^5 + \ldots\right] \sin \omega t$ $= D\left[\frac{i_2}{i_1} + \frac{1}{4}\left(\frac{i_2}{i_1}\right)^3 + \frac{1}{8}\left(\frac{i_2}{i_1}\right)^5 + \ldots\right] \sin \omega t$ (2)

where: C is the voltage gain of the filter amplifier 5 for signals with the angular frequency $\omega$ and $D = A \cdot C$.

If the current $i_1$ is arranged to be sufficiently large compared with $i_2$, the magnitude of higher order terms are negligible compared with that of the first term.
In such a case, it follows:

$e_2 = D(i_2/i_1) \sin \omega t$ (3)

Thus the amplitude of the output A.C. voltage $e_2$ between terminal 6 and terminal 7 is proportional to the quotient of $i_2$ divided by $i_1$ and, therefore, proportional to B/A.

The theoretical relative error $E_r$ of this division circuits, which occurs when the current $i_1$ is arranged not to be sufficiently large compared with $i_2$, is as follows:

$E_r = \dfrac{D\left[\dfrac{i_2}{i_1} + \dfrac{1}{4}\left(\dfrac{i_2}{i_1}\right)^3 + \dfrac{1}{8}\left(\dfrac{i_2}{i_1}\right)^5 + \ldots\right] - D\dfrac{i_2}{i_1}}{D\dfrac{i_2}{i_1}}$ $= \frac{1}{4}\left(\frac{i_2}{i_1}\right)^2 + \frac{1}{8}\left(\frac{i_2}{i_1}\right)^4 + \ldots$ (4)

and in fact, when the ratio of $i_2$ to $i_1$ is 1/10, the relative error is about 0.3%.

With regard to a waveform of the output signal corresponding to the quotient, when it is required to be D.C., the output signal $e_2$ of the filter amplifier is demodulated by the demodulator 8, and when $i_1$ is arranged to be sufficiently large compared with $i_2$, an output voltage of the demodulator 8 or a voltage $e_3$ between terminal 9 and terminal 10 is as follows:

$e_3 = D \cdot F(i_2/i_1)$
$= G(i_2/i_1) \propto B/A$ (5)

where: F is the voltage efficency of the demodulator and $G = D \cdot F$

Thus the D.C. voltage whose magnitude is proportional to the quotient B/A is obtained between terminal 9 and terminal 10.

In the abovementioned circuit, the input current corresponding to the divisor A is D.C. and dividend B is A.C.

When the input current corresponding to the dividend B is also D.C., it is necessary to convert the D.C. current into an A.C. current whose amplitude is proportional to the magnitude of the D.C. current.

In such a case, devices which are shown by broken lines are used.

The operation of these devices is as follows:

Carrier oscillator 12 generate a signal, an angular frequency of which is $\omega$, and the output current $I_0 \sin \omega t$ of this oscillator 12 is modulated by the input current $i_2$, corresponding to the dividend B and coming in through terminal 11, by means of the suppressed-carrier-modulation. Consequently, the output current of modulator 13 is $i_2 \sin \omega t$. This signal is introduced to said terminal 2 and the division is carried out with said operation.

As will be understood from the above description, when the dividend is a constant it is sufficient that the output current of modulator 13 be a constant amplitude. Thus, the current applied to the logarithmic element 4 will be a summation of the current $i_1$ and the current $i_2 \sin \omega t$, the current $i_1$ corresponding to the divisor and the current $i_2 \sin \omega t$ corresponding to the dividend and being of a constant amplitude.

It should be understood that the embodiment herewith shown and described is the form of the invention at present preferred, but the scope of the invention is not limited to the precise details of formulation herein shown but is to be ascertained by reference to the appended claims.

What is claimed is:

1. A division circuit comprising means to introduce an alternating current proportional to a dividend and a current proportional to a divisor simultaneously into a logarithmic element, the voltage across said element being proportional to the logarithm of the current flowing through said element, means to pass only the component of the A.C. fundamental wave from the voltage appearing across said element, and means to amplify and to demodulate said component.

2. A division circuit as in claim 1 further comprising means to produce said alternating current suppressed-carrier-modulated by a current or said voltage proportional to a dividend.

3. A division circuit as in claim 1 wherein said alternating current is of constant amplitude.

4. A division circuit for the production of a signal of a magnitude proportional to a quotient of the magnitude of two input signals, comprising a logarithmic element, means of simultaneously introducing into said element an A.C. current having an amplitude proportional to a dividend and a D.C. current having a magnitude proportional to a divisor, means to produce across said element a voltage which is a linear function of the logarithm of the current flowing through said element and a filter amplifier for amplification of only that frequency component of the voltage occurring across said element, which is at the fundamental frequency of the A.C. current representing the dividend.

5. A division circuit as claimed in claim 4, further comprising means of demodulating the output signal.

References Cited by the Examiner

UNITED STATES PATENTS

| 2,700,135 | 1/1955 | Tolles | 235—194 |
| 2,861,182 | 11/1958 | Green | 235—197 |
| 3,092,720 | 6/1963 | DeVrijer | 235—196 |
| 3,162,758 | 12/1964 | Kamen | 235—196 |

OTHER REFERENCES

Ives "Direct Recording of Wind Slip," Journal of the Franklin Institute, vol. 270, No. 3, September 1960, pages 171–172.

Kahn, Herbert L. "Multiplication and Division Using Silicon Diodes," Review of Scientific Instruments, volume 33, No. 2, February 1962, pages 235–237.

ROBERT C. BAILEY, *Primary Examiner.*

MALCOLM A. MORRISON, *Examiner.*

G. D. SHAW, *Assistant Examiner.*